Nov. 6, 1934.  C. A. CARDEW  1,980,035
APPARATUS FOR TESTING THE PERMANENT WAY OF RAILWAYS, TRAMWAYS, OR THE LIKE
Filed Feb. 12, 1931   5 Sheets-Sheet 1

Inventor,
Cornelius A. Cardew,
By Henry Orth, Atty.

Nov. 6, 1934.    C. A. CARDEW    1,980,035
APPARATUS FOR TESTING THE PERMANENT WAY OF RAILWAYS, TRAMWAYS, OR THE LIKE
Filed Feb. 12, 1931    5 Sheets-Sheet 2
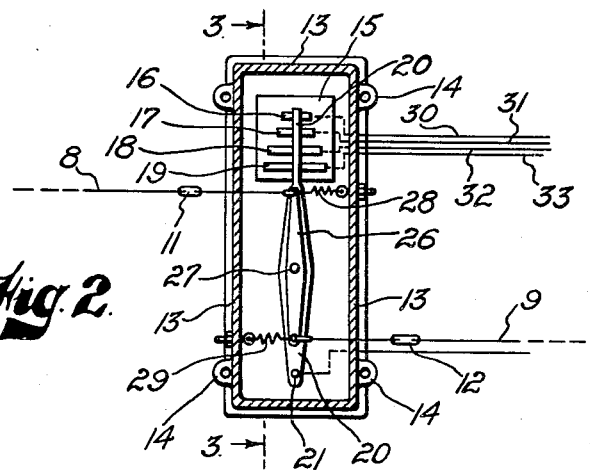
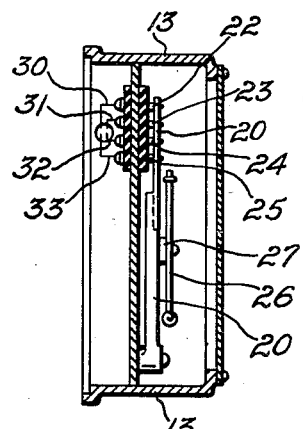
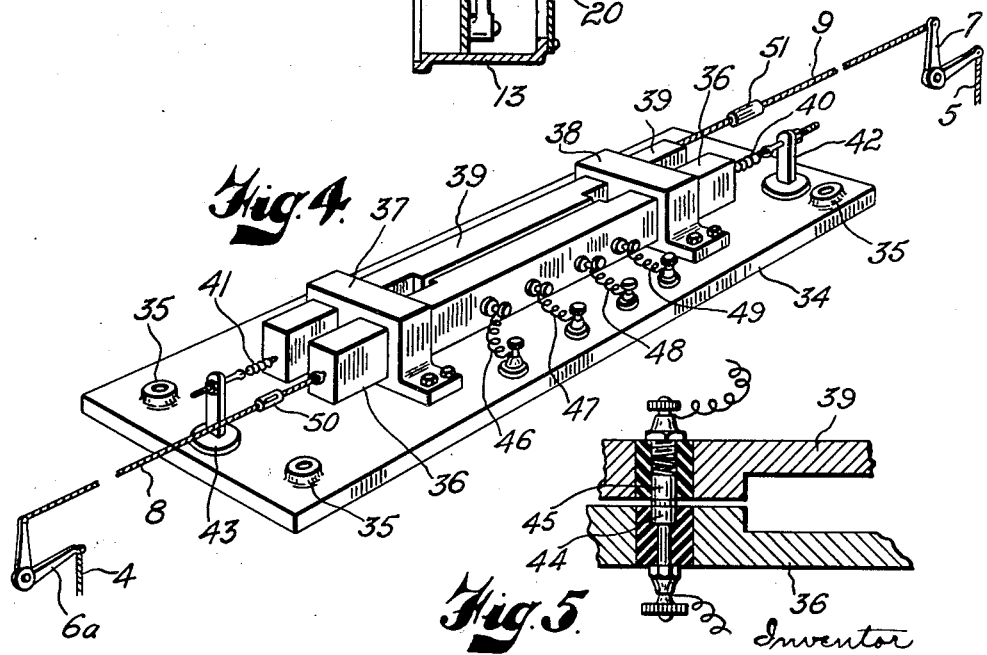

Nov. 6, 1934.   C. A. CARDEW   1,980,035
APPARATUS FOR TESTING THE PERMANENT WAY OF RAILWAYS, TRAMWAYS, OR THE LIKE
Filed Feb. 12, 1931   5 Sheets-Sheet 3
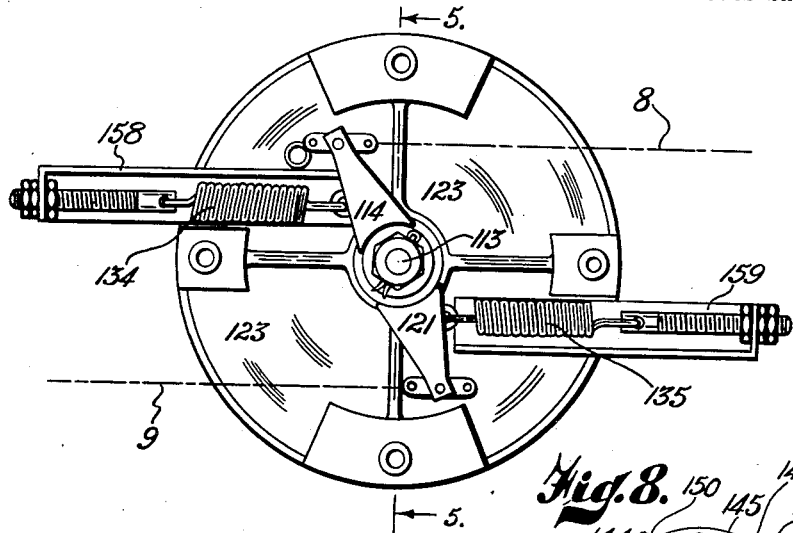
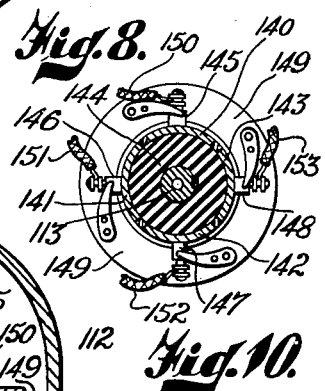
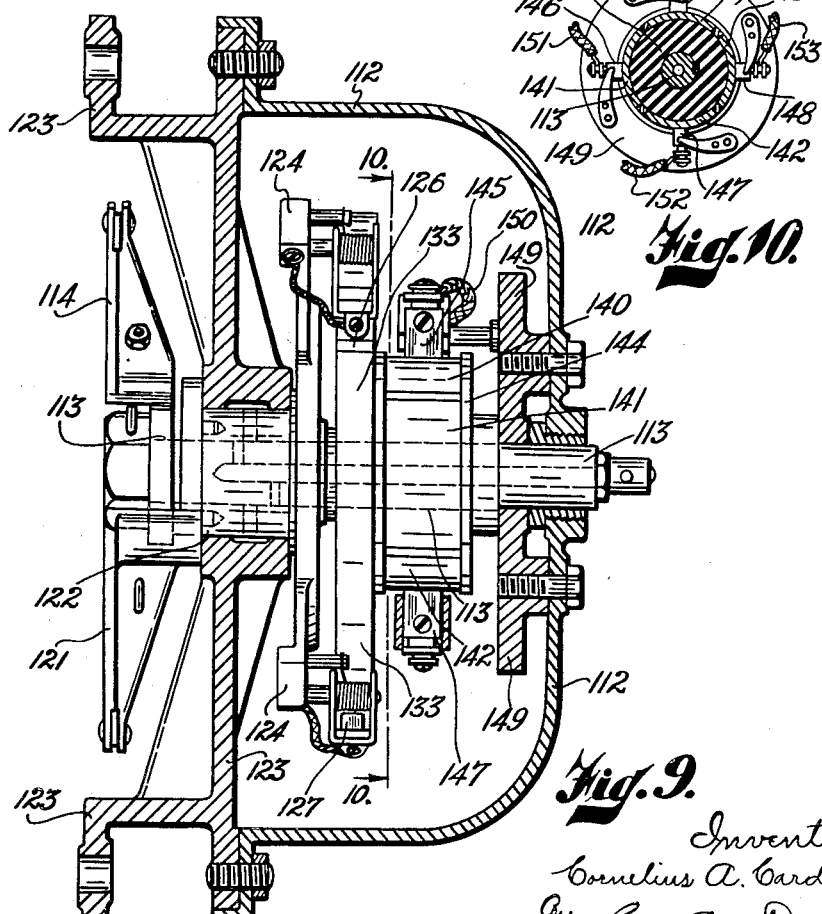

Nov. 6, 1934.  C. A. CARDEW  1,980,035
APPARATUS FOR TESTING THE PERMANENT WAY OF RAILWAYS, TRAMWAYS, OR THE LIKE
Filed Feb. 12, 1931   5 Sheets-Sheet 4

Inventor,
Cornelius A. Cardew,
By Henry Orth Jr.
Atty.

Patented Nov. 6, 1934

1,980,035

UNITED STATES PATENT OFFICE 1,980,035

APPARATUS FOR TESTING THE PERMANENT WAY OF RAILWAYS, TRAMWAYS, OR THE LIKE

Cornelius Ambrose Cardew, Wahroonga, near Sydney, New South Wales, Australia

Application February 12, 1931, Serial No. 515,393 In Australia February 21, 1930

9 Claims. (Cl. 177—311)

This invention relates to improvements in apparatus for testing the permanent way of railways, tramways or the like, comprising detector mechanism mounted upon a sprung portion such as the frame of a heavy wheeled structure, such as a locomotive, and operatively connected to two remotely disposed unsprung portions, such as the axle boxes of the structure whereby the relative movement of the unsprung portions with respect to the sprung portions of the structure operates the detector mechanism, such relative movement being utilized for varying or controlling indicating and, or recording mechanism, when the respective unsprung portions of the structure rise or fall, as the result of rises or hollows in the permanent way which is being tested.

In this specification including the claims:—

(a) The word "fault" (including the plural thereof) is limited to faults consisting of rises or depressions; (b) the word "relative" as applied to the movement of two objects, includes the case where one object moves and the other is stationary; (c) the words "indicate" and "indicating" include "record" and "recording" respectively; (d) the expression "axle box or the like" means axle box, or any other nonsprung part associated with the axle, that is capable of being used for the purpose of imparting the vertical movement of the wheel to the detecting apparatus; and (e) the expression "apparatus of the kind hereinbefore described" means apparatus of the kind described in the first paragraph of this specification.

One of the objects of the invention is to discover faults including those which only become apparent during the passage of heavy rolling stock, travelling at service speeds and under service conditions over the defective part, such a fault for example as the sagging of a rail due to defective ballasting, during the passage of a locomotive.

Another object of the invention is to provide a simple and reliable testing apparatus which may be readily installed upon rolling stock without extensive structural alterations thereto.

Another object of the invention is to provide means which will detect a fault but will not function to detect a swaying movement of the sprung portion of the rolling stock on which it is carried should such portion sway from side to side, or tilt as when rounding a curve.

Another object of the invention is to indicate the presence of a fault either by means of electric light or other signals or by means of a graph or by marking on the track itself the position of the fault or by a combination of such means.

A further object of the invention is to provide an efficient fault detector by means which function by utilizing the vertical movement of one axle box or the like relatively to the vertical movement (or absence of vertical movement as the case may be) of another axle box or the like over the same rail.

A further object of the invention is to provide a testing apparatus which will function satisfactorily in respect of faults of very short time effect as where, for example, the vehicle on which it is mounted is travelling at a high speed over a defective rail joint.

The invention is applicable to mono-rail or double rail tracks, but if it be desired, in the case of double rail tracks, to test both rails simultaneously, the apparatus will be duplicated, one apparatus being provided for each rail.

In this invention I utilize the differential or relative vertical movement of two axle boxes or the like which are unsprung and therefore rise and fall correspondingly to rises and falls in the rail as the wheels pass over it, for the detecting of faults. For the purpose of utilizing this movement I connect the lower end of a vertical member of the apparatus with an axle box or the like; the upper end of this member is associated, through further transmitting means, with the major portion of the detecting apparatus which is attached to some convenient sprung portion of the vehicle, which portion, being sprung is not subject to the up and down movement of the axle box or the like.

But the sprung portion of such a vehicle is liable to sway from side to side and to tilt appreciably whilst rounding curves; so that such a fault detecting apparatus if it depended on the movement of only one axle box or the like, would also function to detect such swaying or tilting movement of the sprung portion of the vehicle, as well as up or down movement of the axle box, and herein lies one of the problems solved by this invention. I solve this problem by incorporating into the action of the apparatus the vertical movement of a second axle box or the like over the same rail, in such a way that the apparatus only functions in response to relative or differential vertical movement of the two axle boxes or the like, and in such a way that such swaying or tilting of the sprung portion of the vehicle, being the same in relation to both axle boxes or the like, does not, by itself, actuate the detector. The vertical movement of the second axle box or the like is communicated to the apparatus by means of a vertical member similar to that which is connected with the first axle box or the like, and by similar transmitting means. The upper ends of these two vertical members, which thus move vertically, relatively to each other, in accordance with the movement of the two axle boxes or the like to which they are respectively attached, are connected with the further transmitting members, which form part of the main structure of the detector apparatus upon the sprung portion of the vehicle. These further transmitting members comprise, in duplicate, (one set being provided for each of the two vertical members) a bell crank lever, or equivalent mechanical means, for converting the vertical movement into horizontal or inclined movement, and a rod or tension wire for the further transmission of the latter movement to a make and break assembly which is mounted upon some suitable part of the sprung portion of the vehicle. The relative movement in the horizontal or inclined direction is applied by the two rods or tension wires to a brush and contact in the make and break assembly and operates to break an electric circuit whereby the fault is detected.

When such electric circuit (herein called the sensitive circuit) is thus broken, it thereby brings into operation certain relays and the next function of the invention, that of indicating the fault, is reached.

In track testing, faults below a certain amplitude of rise or depression, say a quarter of an inch rise or depression, are regarded as harmless and may be ignored. Accordingly, by means of a predetermined adjustment, the detecting assembly is rendered insensitive to faults below a particular amplitude.

Further, it may be desired to distinguish between faults of different amplitudes, say, half an inch, inch, inch and a half, and so on. This may be done by modification of the electrical contact assembly, such modification consisting of providing a plurality of brushes and contacts, one operated by a fault of half inch amplitude, another by a fault of inch amplitude, and so on for as many different amplitudes as may be desired. Each such make and break is in a separate sensitive circuit, and each sensitive circuit actuates a system of relay circuits.

The relays which are operated by the sensitive circuit may include an auxiliary relay and a time relay operating to keep the signalling circuit closed for a sufficient space of time. The signalling circuit operates an electric light, or a graph recording unit, or a valve for ejecting whitewash or the like from a tank to mark the defective portion of the track or any other desired means of indicating the fault. By means of a relay system, including a time relay I ensure the recording of fault detections of very short time duration, and by means of a relay system I relieve the moving parts of the detector apparatus of the burden which mechanically operated, as contrasted with relay operated, indicating mechanism would throw upon such moving parts.

The sensitive circuit is normally closed and when it is opened by the opening of the contacts in the detector it operates a relay, termed sensitive relay, in that circuit. The operation of the sensitive relay energizes other relays and circuits, termed operating relays and circuits, one of which re-energizes the sensitive relay and the sensitive circuit until the detector again operates. The operating relays and circuits remain energized because of a locking circuit until one of the operating relays, which is a timing relay, opens the locking circuit or until the detector contacts have closed, whereupon the indicating mechanism returns to normal with the sensitive circuit energized and the operating relays and circuits de-energized.

Although the relative movement of the said proximate members may be caused to operate mechanical means for indicating the fault, I do not recommend mechanical indicating or recording means because such means involve moving parts of appreciable weight, momentum, and inertia. Many faults are so short that the movement they impart is extremely rapid. The moving parts should therefore be of light construction and I consider that it is undesirable that they should perform the work of operating a mechanical indicating system. Accordingly the apparatus herein described is adapted to operate an electric indicating system.

The details of apparatus embodying the present invention may, within the scope of the invention, be varied considerably without departing from the invention, and three convenient forms of construction are hereinafter particularly described.

In one form of construction (hereinafter called the first alternative detector construction) the vertical movement of the two axle boxes or the like is utilized to operate a floating lever pivoted upon a second lever, which latter is capable of making or breaking the sensitive circuit.

In another form of construction (hereinafter called the second alternative detector construction) the vertical movement of the two axle boxes or the like is utilized to operate two parallel relatively slidable members which carry make and break brushes and contacts and thus, by their relative movement, make or break the sensitive circuit.

In a third form of construction (hereinafter called the third alternative detector construction) the vertical movement of the two axle boxes or the like is utilized to operate two circular members which carry make and break brushes and contacts and are relatively rotatable about a common axis, and thus by their relative rotation make or break the sensitive circuit.

In order that the invention may be more readily understood reference will now be made to the accompanying drawings wherein:—

Figure 2 is an elevation partly in section of the first alternative detector construction.

Figure 3 is a sectional elevation on the line 3—3 of Figure 2.

Figure 4 is a perspective view of the second alternative detector construction.

Figure 5 is a sectional elevation on the line 5—5 of Figure 4.

Figure 8 is a rear elevational view of the construction in Figure 6 showing the two arms for imparting movement, due to track inaccuracies to relatively movable contact members, and also the springs for effecting the return of the arms to their normal position.

Figure 9 is a sectional elevation on the line 5—5 of Figure 8 showing the two arms, the spider carrying the contact brushes, the movable contact disc, the collector ring, the brush mounting therefor and the housing or casing together with the bearing to permit of the necessary rotation.

Figure 10 is a detail sectional elevation on a reduced scale and looking in the direction of the arrows 10—10 on Figure 9 showing the collector ring and its associated brushes.

Figure 1:
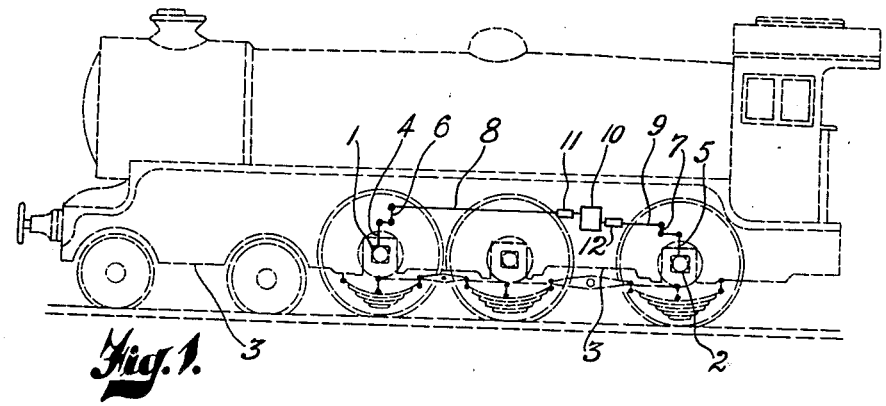
Figure 1 shows in elevation the layout of connection between the detector assembly and the two axle boxes.
Figure 6:
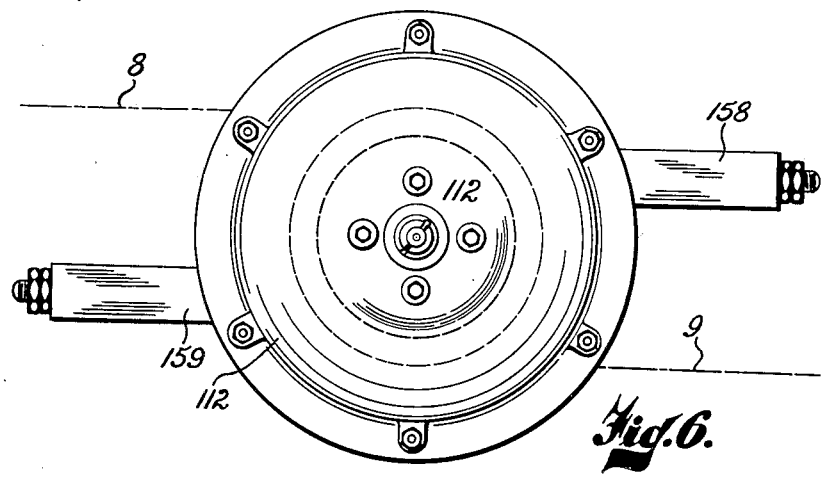
Figure 6 is a front elevation of the third alternative detector construction.
Figure 7:
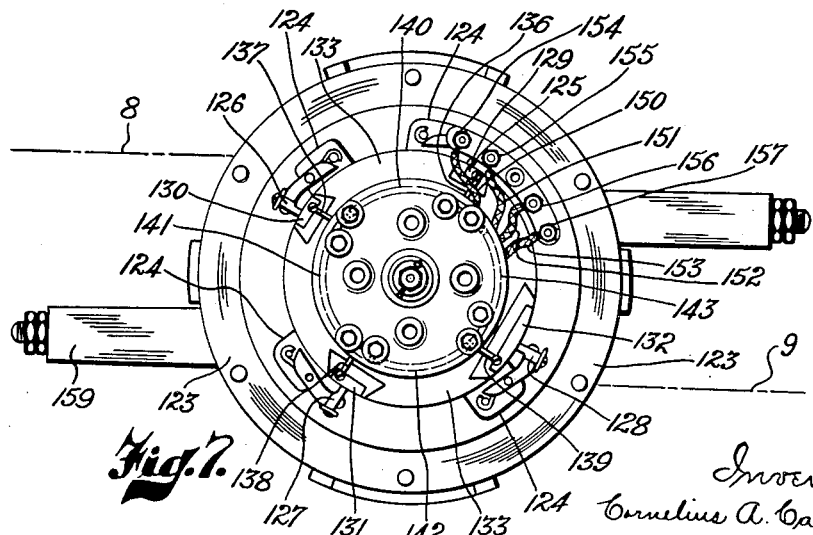
Figure 7 is a corresponding view of the mechanism shown in Figure 6 with the cover removed.

Referring to Figure 1, 1 is an axle box of the vehicle upon which the apparatus is mounted, and 2 is another axle box of the same vehicle over the same rail. The two axle boxes selected for the purpose of the invention should not be so close together that they are both apt to be simultaneously affected by the same fault, nor should they be at a distance equal to the distance between consecutive rail joints; I prefer a distance of about 15 feet between them. 3 represents the sprung portion of the vehicle.

Vertical rods or wires 4 and 5 are attached to the axle boxes 1 and 2 respectively. 6 and 7 are bell crank levers of similar dimensions pivoted upon the sprung portion of the vehicle and one arm of each bell crank lever is approximately horizontal while the other arm is vertical or inclined. For the purpose of the first alternative detector construction, wherein there is a floating lever pivoted upon another lever, the two bell crank levers should face in opposite directions as they do in Figure 1.

For the purpose of the second alternative detector construction the two bell crank levers should face in the same direction as is indicated in Figure 4 wherein they are numbered 6a and 7. For the purpose of the third alternative detector construction Figures 6 to 10 the two bell crank levers may face either in the same or in opposite directions. The upper end of the vertical rod 4 is pivotally attached to the horizontal arm of the bell crank lever 6 or 6a as the case may be and the upper end of the vertical rod 5 is pivotally attached to the horizontal arm of the bell crank lever 7. 8 is a rod, or a wire under tension, of which one end is pivotally attached to the vertical arm of the bell crank lever 6 or 6a; 9 is a rod or wire under tension, one end of which is pivotally attached to the vertical arm of the bell crank lever 7; the other ends of the members 8 and 9 actuate the detector 10 as will be explained later. Means (such as adjusting shackles 11 and 12, Figure 1) are incorporated into the members 8 and 9 for the purpose of adjusting the length of these members.

Figure 13:
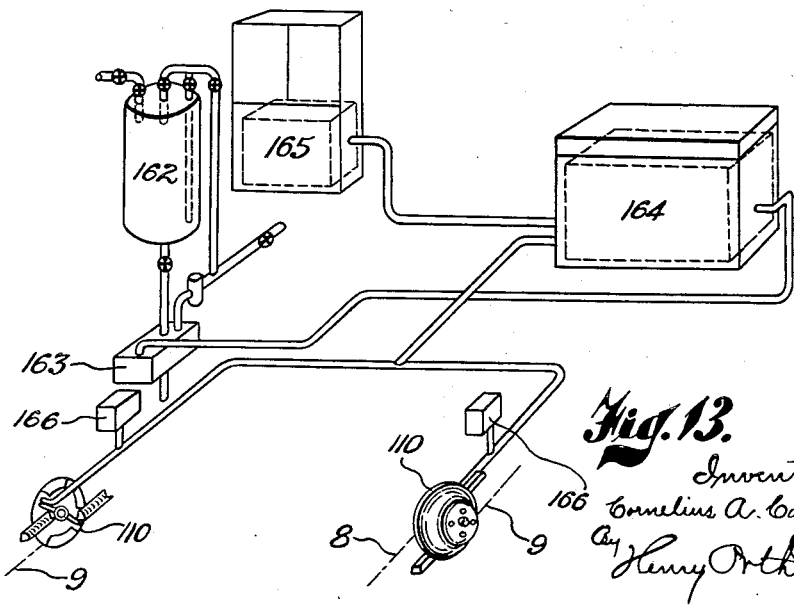
Figure 13 is a diagrammatic view illustrating a suitable arrangement of the various apparatus and mechanism, combined in the general scheme for detecting, indicating and recording faults of the kind referred to with respect to both rails of a track.

In the first alternative detector construction which is illustrated in Figures 2 and 3, 13 is a frame, which is attachable to some convenient part of the sprung portion of the vehicle by means of lugs 14.

A slab 15 of electrically insulating material is attached to the frame 13. 16, 17, 18 and 19 are metallic contacts inset into the slab 15 so that their outer surfaces are flush with the face of the slab 15. The contacts 16, 17, 18 and 19 are of different sizes after the manner shown in Figure 2. A contact lever 20 is pivoted at 21 and carries brushes 22, 23, 24 and 25 which register with the contacts 16, 17, 18 and 19 respectively. A floating lever 26 is pivoted at its centre upon a pin 27 which is attached to the contact lever 20 at a convenient distance from its fulcrum or pivot 21. The rod or wire 8 is attached at one end of the floating lever 26 and the rod or wire 9 is attached to the other end of the floating lever 26. If the members 8 and 9 are wires such wires are maintained in a state of tension by means of tension springs 28 and 29 respectively which are anchored to the frame 13 and attached to the ends of the respective wires 8 and 9.

Insulated wires 30, 31, 32 and 33 are conducted in a suitable way through the frame 13, and thence pass behind the slab 15 where they are respectively connected with the contacts 16, 17, 18 and 19 respectively. The four brushes carried by the contact lever 20 are in electrical contact with the said contact lever 20 which latter is earthed. Each wire 30, 31, 32 and 33 forms part of a separate sensitive circuit which is closed via the contact to which the wire is attached and the brush which registers with the said contact. Each sensitive circuit is normally closed, and when it is broken it actuates a relay system the details and operation of which will be described later.

When it is desired to test a line of rail, the apparatus is adjusted by means of the shackles 11 and 12 or equivalent device so that the free end of the contact lever 20 is centrally situated over the contacts 16, 17, 18 and 19, and when the vehicle is on a track practically free from faults.

In operation, when the wheel associated with the axle box 1 passes over a fault, it moves upwards or downwards, according to the nature of the fault, and with the wheel, its axle box 1 similarly moves upwards or downwards.

Owing to the interposition of the springs and suspension system of the vehicle, the movement of the axle box is mostly taken up by such spring and suspension system and is not communicated to the sprung portion of the vehicle to a sufficient extent to interfere with the action of the detector apparatus; accordingly, when the axle box 1 moves upwards or downwards in response to a fault, the movement is transmitted by means of the vertical rod or wire 4, the bell crank lever 6 and the rod or wire 8 to the floating lever 26. At the same moment the axle box 2 will not have reached the fault and will not have been deflected thereby, but will be in its normal position in relation to the sprung portion of the vehicle; accordingly no movement is transmitted via the vertical rod or wire 5, the bell crank lever 7 and the rod or wire 9 to the other end of the floating lever 26 and the said end is held in fixed position by the rod or tension wire 9 and spring 29. It will thus be seen that the vertical movement of the axle box 1 relatively to the axle box 2 is communicated to the floating lever 26 in such a way that the upper end thereof is caused to move or rotate relatively to the lower end which remains fixed; such rotatory movement of the floating lever 26 about its lower end carries with it the pin 27 and thereby causes the contact lever 20 to move about its pivot 21 and thus detect the fault.

When the fault which is detected by the movement of the contact lever 20 is of less amplitude than the minimum, for the detection of which, the apparatus is adjusted, the said lever does not move sufficiently to break the contact between the brush 22 and the shortest contact 16, but when the fault exceeds such minimum amplitude it causes the contact lever 20 to move sufficiently to break the contact between one or more successively of the brushes 22, 23, 24, and 25 and their respective contacts 16, 17, 18 and 19 successively according to the magnitude of the fault, whereupon the relay and/or indicating systems which have been connected to the corresponding sensitive circuits will be brought into operation.

When the sprung portion of the vehicle tilts to one side or the other, as generally happens on a curve, it causes the parts 8 and 9 to move equally in opposite directions; such equal and opposite movement of the parts 8 and 9, is imparted to the ends of the floating lever 26, with the result that the floating lever 26 rotates about the pin 27 without altering the position of the said pin and without imparting any movement to the contact lever 20.

It will thus be seen that the contact lever 20 is actuated only by the relative vertical movement of the axle boxes 1 and 2 and is not affected by a tilting sideways of the sprung portion of the vehicle.

According to the second alternative detector construction, the details of which are shown in Figures 4 and 5, the vertical movement of two axle boxes is used as the means for directly operating contact members.

34 is a frame which is provided with bosses 35 whereby it is bolted to some suitable part of the sprung portion of the vehicle. 36 is a bar slidable lengthwise through bearing members 37, 38, incorporated in the frame 34. 39 is another bar parallel to the bar 36, and also slidable lengthwise through said bearing members 37, 38 similarly incorporated in the frame 34. The bars 36 and 39 project sufficiently beyond the ends of the bearing members 37 and 39 to allow for the movement which takes place when the apparatus is in operation. That surface of each bar which faces the other bar is hereinafter called its face. Each bar may be made of insulating material; if not, the proper insulation of the contacts and associated parts must be provided for, as will be readily understood and carried out by any competent electrician.

One end of one of the bars 36 and 39 is attached to the rod 8 and the opposite end of the other bar is attached to the rod 9; as shown in Figure 4 the left hand end of the bar 36 is attached to the rod 8 while the right hand end of the bar 39 is attached to the rod 9.

If the members 8 and 9 are in the form of tension wires instead of rods, such wires are maintained in tension by means of tension springs 40 and 41 anchored to brackets 42 and 43 upon the frame 34 and attached to the ends of the bars 36 and 39 respectively.

Contacts 44 of different lengths one of which is shown in Figure 5, are inset in the face of the bar 36 and are flush therewith. Brushes 45 one of which is shown in Figure 5, are set in cavities in the face of the bar 39 and are preferably spring actuated, according to well known electrical practice, in order to ensure contact and compensate for wear.

The brushes 45 register centrally with the contacts 44 when the bars 36 and 39 are at normal position. The brushes 45 are earthed. Flexible insulating wires 46, 47, 48 and 49 are connected with the respective contacts 44.

Each of the insulated wires 46, 47, 48 and 49 forms part of a separate sensitive circuit which is closed via the particular contact 44 to which it is attached and the particular brush 45 which registers with such contact.

As in the case of the first alternative construction, each sensitive circuit is normally closed, and when it is broken it actuates a relay system the details and operation of which will be described later.

Obviously, if it is so desired, the bar 36 may carry the brushes 45 instead of the contacts while the bar 39 carries the contacts 44 instead of the brushes 45.

For the purpose of this second alternative detector construction the bell crank levers 6a and 7 face in the same direction, as it is necessary, for the purpose of eliminating the effect of tilting of the sprung portion of the vehicle, that the members 8 and 9 should move in the same direction when such tilting occurs.

The bars 36, 39 are adjusted, by means of the shackles 50, 51 so that in their normal position the brushes 45 are in contact with the centres of the corresponding contacts 44. In operation, when the axle box 1 moves upwards or downwards in response to a fault, the movement is transmitted by means of the vertical rod 4, the bell crank lever 6 and the rod or wire 8, to the bar 36. At the same moment the axle box 2 will not have reached the fault, and, as already explained there will consequently be no movement in the member 9, so that the bar 39 will remain in its normal position.

It will thus be seen that the vertical movement of the axle box 1 relatively to the axle box 2 causes a longitudinal movement of the bar 36 relatively to the bar 39 and that the amplitude of the relative movement between the said bars varies in proportion to the amplitude of the movement of the axle box 1 relatively to the axle box 2. The movement of the two adjacent bars 36 and 39 serves to detect the fault.

When the fault exceeds the minimum amplitude for the detection of which the apparatus is adjusted, the movement of the bar 36 relatively to the bar 39 causes a break of contact between one or more successively of the brushes 45 and one or more successively of the contacts 44 according to the amplitude of the fault whereupon the connected relay system or systems is or are brought into operation.

If, from any cause, the sprung portion of the vehicle is tilted to one side or the other, both the bars 36, 39 move equally in the same direction so that such tilting does not affect or interfere with the fault detecting function of the apparatus.

The third alternative detector construction, which is illustrated in Figures 6 to 10 comprises a casing or housing 112 which is journalled to a shaft 113 connected to an arm 114 which is capable of being oscillated and is connected with the rod or wire 8.

The other rod or wire 9 is connected to a second arm 121 which has a boss 122 concentrically mounted upon the left hand end of the shaft 113 (see Figure 5) and is supported in the base 123 of the housing 112. The arm 121 is free to move independently of the arm 114 when actuated by movement of the member 8 to which it is connected. The boss 122 of the arm 121 has a spider 124 mounted thereon which latter carries a set of brushes 125, 126, 127, 128 four being illustrated.

The brushes 125, 126, 127 and 128 are adapted to normally engage respective contacts 129, 130, 131, and 132 forming part of a contact disc 133. The contact disc 133 is keyed to the shaft 113 and is adapted to be oscillated thereby when the arm 114 is moved by its member 8.

Where the connections 8 and 9 are of wire they are maintained in tension by springs 134 and 135 which are anchored to suitable brackets 158, 159 and attached to the arms 114 and 121.

The contacts 129, 130, 131, 132 on the disc 133 are connected respectively by wires 136, 137, 138 and 139 to respective contact segments 140, 141, 142, 143 disposed upon a contact ring 144 mounted upon and insulated from the shaft 113. The contact ring segments 140, 141, 142, 143 are engaged respectively by brushes 145, 146, 147, 148 which are carried upon a member 149 fixed to the housing 112. The brushes 145, 146, 147, 148 are connected respectively by flexible wires 150, 151, 152, 153 to terminals 154, 155, 156, 157 all of which are shown in Figure 10.

If desired the contacts 129, 130, 131, 132 on the contact disc 133 may be connected by flexible wires directly to the terminals 154, 155, 156 and 157 in which case the contact segments 140, 141, 142 and 143 and their respective brushes and the contact ring 144 may be dispensed with.

In the example illustrated in Figures 8 and 9 the arm 114 in normal position is set at an angle of 180° with the arm 121; with this setting of the arms the bell crank levers 6 and 7 must face in opposite directions. If desired the construction of the detector may be modified so that the said arms point in the same direction, either upwardly or downwardly, but in that case the bell crank levers must face in the same direction.

In operation, as will be readily understood from the explanation of the operative stages in the first and second alternative constructions, a tilting of the sprung portion of the vehicle moves both members 124 and 133 equally in the same direction whilst a fault causes them to move relatively and thus detect the fault.

In all the alternative constructions the sensitive circuits are provided with switches (not shown) so that the operator desiring to test for faults of certain amplitudes determined upon may bring in the circuit or circuits which record those amplitudes, and cut out the remaining circuits.

All the alternative constructions are shown with four sets of brushes and contacts and four sensitive circuits; it will be understood that the detector apparatus may be constructed with a greater or less number of sets of brushes and contacts and sensitive circuits.

By increasing or reducing the length of the corresponding arm of each bell crank lever, the amplitude of the relative motion between the member which carries the brushes and the member which carries the contacts corresponding to a fault of particular amplitude, may be varied and regulated as desired, so that, for example a brush which with normal adjustment, breaks circuit with its contact in response to a fault of, say, half an inch, will so function in response to a fault of say, a quarter of an inch or three quarters of an inch, and so on with the other brushes and contacts.

Figure 11:
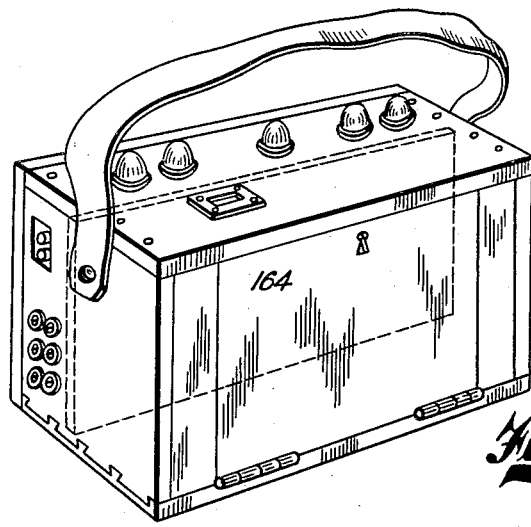
Figure 11 is an external perspective view of one form of indicating apparatus comprising relays and lamps and other mechanism adapted to be controlled by the detector apparatus.
Figure 12:
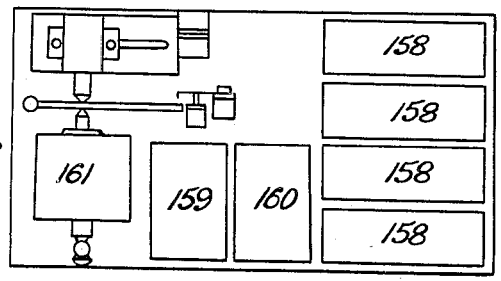
Figure 12 is a diagrammatic elevational view illustrative of an arrangement of electrical apparatus such as would be used with the detector apparatus.

A suitable form of indicating and recording mechanism is illustrated in Figures 11 to 13. This includes indicating lamps, relays which are connected in circuit with one or other of the sensitive circuits and other relays, together with devices which may be required to automatically reset the sensitive circuits after they have operated, and devices for the purpose of operating other electrical or mechanical devices such as an electropneumatically operated device for spraying whitewash upon the track at defective places.

As illustrated in Figure 12 the indicating mechanism comprises four sensitive relays 158, each of which is adapted to be placed in series with one or other of the normally closed sensitive circuits. The sensitive relays 158 operate in conjunction with an auxiliary relay 159 a reclosing relay 160 and a time relay 161 herein before referred to as the operating relays.

The recording mechanism is illustrated diagrammatically in Figure 13 which also illustrates the general arrangement of the detector and indicating apparatus upon a vehicle. A detector 110 is shown for each side of the vehicle in order that both tracks may be tested simultaneously. In this view the various apparatus are shown connected by conduit through which the various wires are conducted. A tank 162 for whitewash is controlled by an electro-pneumatic valve 163 and is adapted to supply whitewash or paint under pressure for application to the rail upon which the vehicle is moving when the indicator 164 functions under the action of the detector apparatus 110. A battery is contained in the box 165.

A lamp 166 is provided for each detector for the purpose of indicating when the brushes 126, 127, 128 are disposed centrally with respect to their contacts. The lamp 166 is connected in series with the contact 129 and brush 125. The spider 124 and contact disc 133 are adjusted relatively to one another so that the brushes 125 will just engage the contact 129 when the brushes 126, 127, 128 are disposed centrally with respect to their corresponding contacts 130, 131 and 132.

Figure 14:
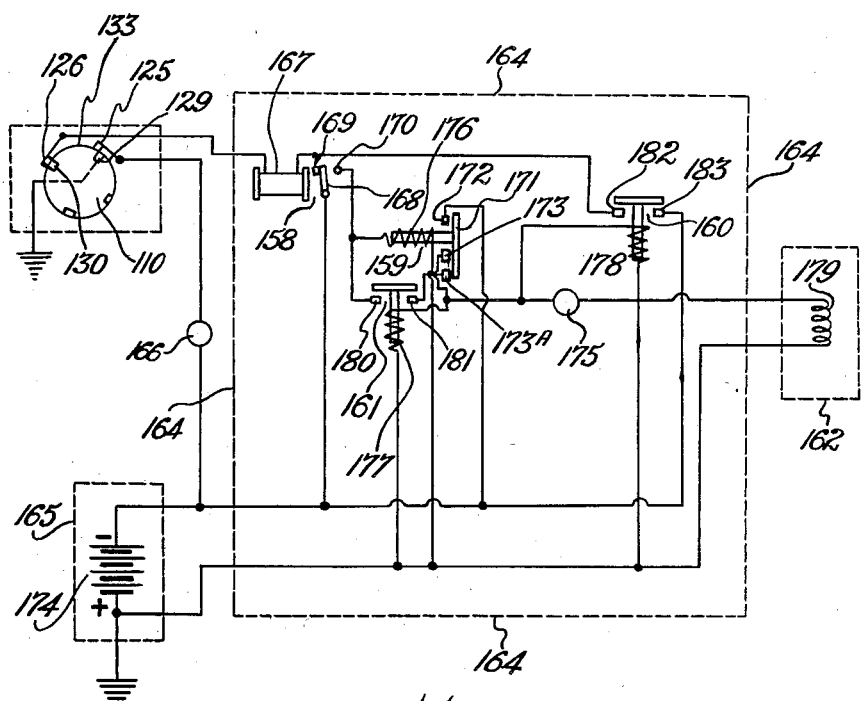
Figure 14 illustrates diagrammatically a suitable circuit arrangement which could be adopted in an indicator such as that referred to in Figures 12 and 13 in conjunction with marking mechanism, and a detector of any of the kinds illustrated.

For the purpose of example, the operation of one of the sensitive relays 158 will be described in relation to its associated mechanism by the aid of the circuit diagram shown in Figure 14, the apparatus being in their normal position with the brush 126 on the contact 130.

It is assumed that the brush 126 is moved from the contact 130 due to the differential movement imparted to the spider 124 and/or contact disc 133 caused by the wheel or wheels encountering a defect such as a depression in the track.

When the brush 126 leaves the contact 130 the current normally flowing through the coil 167 of a relay 158 is interrupted at the said contact 130 with the result that the relay 158 is de-energized and its armature 168 leaves the contact 169 and engages the contact 170.

This completes a circuit for supplying current to the coil 176 of an auxiliary relay 159 whose armature 171 closes contacts 172, 173 and 173a and completes a circuit for the supply of current from the battery 174 to the indicating lamp 175, coil 177 of time relay 161, coil 178 of the reclosing relay 160, and to the coil 179 of the electro-magnetic valve 163 of the whitewash tank 162 with the result that the track is sprayed or marked at the defective point.

The auxiliary relay coil 176 on becoming energized and closing the contact 172, 173 and 173a has provided itself with current from the battery 174 by way of the contacts 180, 181 of the time relay 161, so that it remains effective after the sensitive relay has returned to normal.

The reclosing relay coil 178, on becoming energized as described above and closing its contacts 182, 183, re-energizes the coil 167 of the sensitive relay 158 which thereupon returns its armature 168 to its normal position, upon contact 169, to be again ready for operation when the brush 126 and contact 130 are again separated as the result of a further defect in the track being detected.

After a predetermined period of time (hereinafter called the recording interval) sufficient for the recording mechanism to function the time relay 161 opens its contacts 180, 181 and deprives the coil 176 of the auxiliary relay 159 of current with the result that the whole of the apparatus constituting the indicating and recording mechanism returns to normal position, ready for operation when the detector 10 again functions.

The other contacts and brushes of the detector 10 may be similarly connected to operate similar mechanism to that just described when they are connected to record a fault in the surface of the track and are in turn opened.

It will be understood that both axle boxes necessarily pass over the same fault in succession as the vehicle advances, and when the second axle box passes over the fault it may cause a repetition of the relative movement of the brush and contact members; this may result, when the vehicle is travelling at slow speeds, in two records, in rapid succession of each fault.

As the two records are so close I do not consider that this circumstance is any practical disadvantage in the actual use of the apparatus. In practice the testing is carried out on an ordinary locomotive running under service conditions.

It is obvious that if the contact pieces are extended in one and the same direction beyond the maximum amplitude of movement of the brushes, rises only are then recorded through one axle box and depressions only are recorded through the other axle box and the possibility of double recording of the same fault is excluded.

It is desirable that the apparatus be mounted upon a heavy vehicle such as a heavy locomotive, with three or more wheels on each side, and efficiently sprung. The detector apparatus is not intended for use upon an unsprung vehicle, or one which is inefficiently sprung, or one which is liable to a pitching motion in the direction of travel.

Instead of arranging for a breakage of the sensitive circuit to operate the indicating apparatus, it could be arranged for a making of the circuit to operate it, but the former is preferable due to the greater speed of operation of a relay on breaking its circuit.

I claim:—

1. In testing apparatus, for the permanent way of railways, mounted upon the sprung portion of a locomotive having a central pair of wheels and a pair of wheels on either side thereof termed remotely disposed wheels each of which has an axle box, two members mounted upon the sprung portion of the locomotive and each capable of movement relatively to the other, means for transmitting vertical movement from the respective remotely disposed axle boxes on the same side of the locomotive to one of the respective members, means responsive to relative movement of the members due to unequal vertical movement of the axle boxes to cause an electric circuit to be closed, equal vertical movements of the said axle boxes in the same direction on the same side of the vehicle being ineffective to cause said circuit to be closed.

2. In testing apparatus, for the permanent way of railways, mounted upon the sprung portion of a locomotive having a central pair of wheels and a pair of wheels on either side thereof termed remotely disposed wheels each of which has an axle box, two members each capable of movement relatively to the other when operated respectively by unequal vertical movement of the axle boxes of the remotely disposed wheels upon one side of the locomotive, one of the members being provided with a plurality of contacts engaged by brushes mounted upon the other member, said brushes and contacts being part of an electric circuit including an indicating device, the relative movement of the said members being unaffected by equal vertical movement of the said axle boxes.

3. In testing apparatus, for the permanent way of railways, mounted upon the sprung portion of a locomotive having a central pair of wheels and a pair of wheels on either side thereof termed remotely disposed wheels each of which has an axle box, a fixed member having a plurality of contacts each of a different length, a contact lever pivoted at one end and carrying brushes for engaging the plurality of contacts, a floating lever pivoted centrally upon the contact lever, said floating lever being pivoted at a position on one side or the other of the pivot point of the contact lever, transmitting means attached to the respective ends of the floating lever and to the axle box of the respective remotely disposed axles, on one side of the locomotive, said brushes and contacts being part of an electric circuit including an indicating device.

4. In testing apparatus, for the permanent way of railways, mounted upon the sprung portion of a locomotive having a central pair of wheels and a pair of wheels on either side thereof termed remotely disposed wheels each of which has an axle box, two parallel slidable members each capable of movement relatively to the other by means connecting them indirectly with respective remotely disposed axle boxes upon one side of the locomotive, the relative movement of the said slidable members being unaffected by equal vertical movement of the said axle boxes, one of the parallel members being provided with a plurality of contacts engaged by brushes mounted upon the other member, said brushes and contacts being part of an electric circuit including an indicating device.

5. In testing apparatus, for the permanent way of railways, mounted upon the sprung portion of a locomotive having a central pair of wheels and a pair of wheels on either side thereof termed remotely disposed wheels each of which has an axle box, two members capable of relative rotary movement with relation to each other, a shaft for maintaining the said two members in operable relationship, a frame within which the said two members and shaft are mounted upon the sprung portion of the locomotive, two sets of transmitting means attached to the remotely disposed axle boxes on the same side of the locomotive and to the two relatively rotatable members respectively whereby unequal vertical movement of the respective remotely disposed axle boxes is transmitted to the respective relatively rotatable members, the relative movement of the said rotatable members being unaffected by equal vertical movements of the said axle boxes.

6. In testing apparatus, for the permanent way of railways, as defined by claim 5, a casing having a base, a shaft mounted in the casing, means for imparting rotary movement to the shaft from one of the remotely disposed axle boxes, means on the shaft for carrying a plurality of contacts, and means concentrically mounted with respect to the shaft for carrying brushes for engaging the contacts, said concentrically mounted means being capable of movement in an opposite direction to the shaft by means connected to the other remotely disposed axle box on the same side of the locomotive.

7. In testing apparatus, for the permanent way of railways, as defined by claim 5, a rotary movable spider member carrying a plurality of brushes and a concentrically mounted movable disc member having a plurality of contacts for engagement respectively with the brushes, the spider and the disc being connected respectively to the remotely disposed axle boxes upon the same side of the locomotive, the brushes and contacts being part of an electric circuit including an indicating device.

8. In an apparatus for the testing of railway tracks and the like, installed on a locomotive having a central sprung portion between two remotely spaced unsprung portions on the same side of the locomotive; a detector mechanism mounted on said sprung portion of the locomotive, two relatively movable members in said detector mechanism the relative movement of the said members being unaffected by equal vertical movement of the said unsprung portion of the locomotive, means for indicating the relative movement between said members, and means connected to said remotely spaced unsprung portions and to said relatively movable members for transmitting the relative vertical movement between said sprung and unsprung portions to said movable members.

9. In an apparatus for the testing of railway tracks and the like, as defined by claim 8, mechanism in which the means which indicate the relative movement between said members comprises a plurality of coacting, relatively movable, electric contacts on said two relatively movable members, which contacts make and break electric circuits including an indicating device.

CORNELIUS AMBROSE CARDEW.